April 1, 1958  DE WITT T. LATIMER, JR  2,829,364
ANGULAR POSITION INDICATING SYSTEM
Filed March 30, 1955  2 Sheets-Sheet 1

INVENTOR
DEWITT T. LATIMER JR.

BY
ATTORNEYS

April 1, 1958     DE WITT T. LATIMER, JR     2,829,364
ANGULAR POSITION INDICATING SYSTEM Filed March 30, 1955     2 Sheets-Sheet 2

INVENTOR
DEWITT T. LATIMER JR.

BY

ATTORNEYS

United States Patent Office 2,829,364
Patented Apr. 1, 1958

2,829,364
ANGULAR POSITION INDICATING SYSTEM

De Witt T. Latimer, Jr., Lexington Park, Md., assignor to the United States of America as represented by the Secretary of the Navy Application March 30, 1955, Serial No. 498,122

18 Claims. (Cl. 343—106)

(Granted under Title 35, U. S. Code (1952), sec. 266)

The invention described herein may be manufactured and used by or for the Government of the United States of America for governmental purposes without the payment of any royalties thereon or therefor.

The present invention relates to an angular position indicating system and more particularly to an angular position indicating system and the transmitting and receiving components thereof.

Systems have been developed for indicating the position of one point, hereinafter referred to as the receiving point, with respect to a reference direction from another point, hereinafter referred to as the reference point. One of the better known uses for these systems is for the determination of position of aircraft with respect to a predetermined course. These prior systems obtain angular position information from the comparison of phases of two voltages received at the point in question. The phase of one voltage is fixed while the phase of the other voltage is varied as a function of the angular position of the receiving point. It is apparent that the components required to perform the functions of these prior systems have the disadvantages of complexity and high cost.

In the present invention, a transmitting unit at the reference point transmits a narrow beam which is scanned back and forth through any desired coverage angle. During the period of beam travel in one direction a first coded wave is transmitted, and during the travel time in the reverse direction a second coded wave, different from the first, is transmitted. When the beam sweeps across the receiving point, the received wave initiates a signal in a receiving unit and terminates a different signal that was being produced. The next time the beam sweeps across the receiving point the different signal is initiated and the other signal terminated, and etc. Thus, two different signals are produced in the receiving unit, the periods of which are functions of the lengths of time that the beam is right and left of the receiving point. The employment of two codes permits an additional feature; viz., the determination of the direction of angular position. The receiving unit is such that the first coded wave can trigger only one of the different signals and the second coded wave can trigger only the other signal; hence, through detection of which signal is larger or smaller, the right or left direction of the angular position can be determined. The transmitter can be employed, simultaneously, in the angular indicating system and also in a radar system.

Accordingly an object of the present invention is the provision of a low cost and incomplex system and units thereof for indicating the position of one point with respect to a reference direction from another point.

Another object is to provide a transmitting unit, a receiving unit, and a combination thereof for producing a signal which is a function of the angular position and direction of a receiving point with respect to a reference direction from a receiving point.

A further object of the present invention is the provision of a receiving unit for producing two different signals the periods of which are a function of the times of reception of two alternating distinctive waves.

Still another object of the present invention is the provision of a transmitting unit for transmitting an alternatingly reversing scanning beam having distinctive signals for each direction of scan.

Other objects and many of the attendant advantages of this invention will be readily appreciated as the same becomes better understood by reference to the following detailed description when considered in connection with the accompanying drawings wherein.

Figure 1:
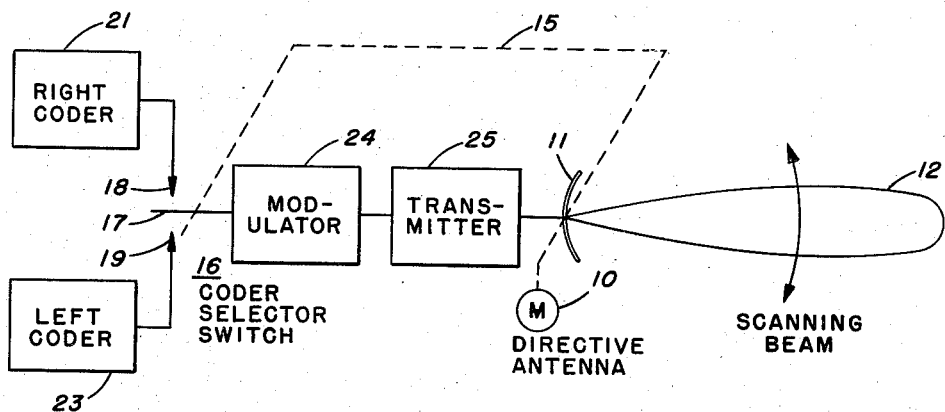
Fig. 1 shows a schematic view of a transmitting unit for a preferred embodiment of this invention.

Referring now to the drawings wherein like reference characters designate like or corresponding parts throughout the several views, there is shown in Fig. 1 (which illustrates a preferred embodiment) a directive antenna 11 for radiating a narrow scanning beam 12 from transmitter 25. Motor 10 is used to activate antenna 11 with a back and forth motion which is transmitted to coder selector switch 16 by linkage 15. It is to be appreciated, however, that other means such as electronic means can be employed to scan the beam and also that the linkage 15 and switch 16 may be of any suitable type, e. g. mechanical, electrical, hydraulic or etc. Arm 17 of switch 16 makes contact with either terminal 18 or 19 depending upon the direction of movement of beam 12. Thus, either the right coder 21 or the left coder 23 is connected through switch 16 to modulator 24 and transmitter 25.

Figure 2:
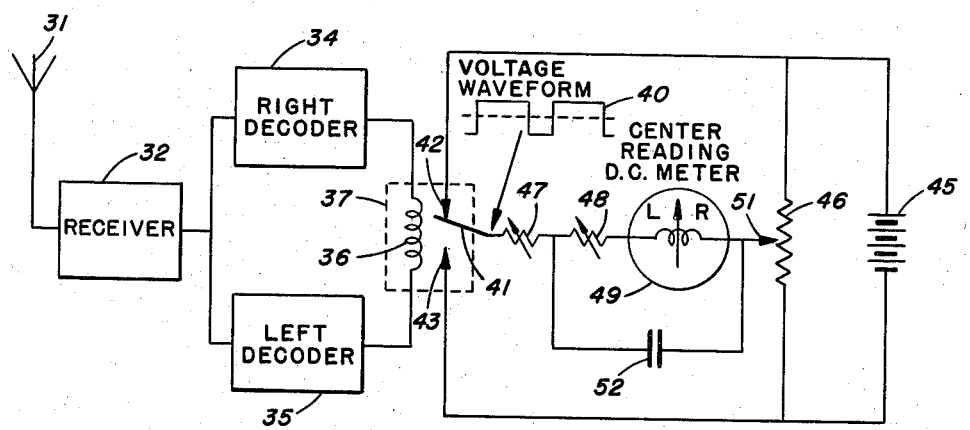
Fig. 2 is a schematic view of a receiving unit for a preferred embodiment of this invention.

In the receiving unit of Fig. 2, antenna 31 is energized by scanning beam 12 and produces a signal which is conducted to receiver 32 where the signal is demodulated. Right decoder 34 and left decoder 35, which are connected to the output of receiver 32, alternately but continually energize coil 36 of switch 37, which can be an electronic, mechanical, or other type switch. Arm 41 is connected to terminal 42 or 43 depending upon which decoder energizes switch coil 36. D. C. source 45 and potentiometer 46 are connected in parallel across terminals 42 and 43. The series combination of variable resistors 47 and 48 and D. C. meter 49 joins switch arm 41 to potentiometer arm 51. A damping capacitor 52 is connected in parallel with meter 49 and resistor 48. Specific circuits, capable of performing the functions of the "box components" of Figs. 1 and 2 are readily available to one skilled in the art and thus such circuits have not been shown in order to simplify the disclosure.

Figure 3:
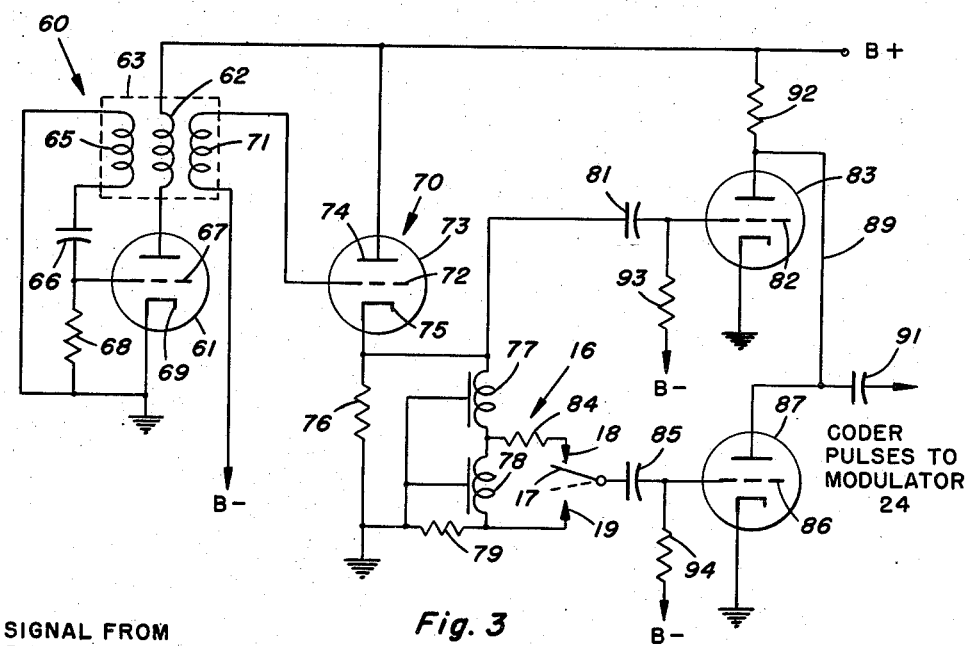
Fig. 3 illustrates a circuit diagram of components which can be employed in the transmitting unit of Fig. 1.

Fig. 3 illustrates a coder system and switch arrangement that can be employed in the transmitting unit of Fig. 1. A single-swing free-running blocking oscillator 60 is provided to generate short pulses. Triode 61 of the oscillator 60 has a plate connected by winding 62 of transformer 63 to a B+ supply. A feed back winding 65 is joined through capacitor 66 to grid 67 of triode 61. Resistor 68 provides a grid leak for grid 67 and a discharge path for capacitor 66. Winding 71 conducts the output of oscillator 60 to grid 72 of cathode follower triode 73. A B— supply biases grid 72 negative via winding 71. Plate 74 is connected to the B+ supply and cathode 75 is connected through resistor 76 to ground. The output of the cathode follower 70 drives the series connection of delay lines 77 and 78 and resistor 79. The undelayed output is applied by coupling capacitor 81 to the grid 82 of tube 83. In order to simplify the drawing, a linkage from antenna 11 to switch 16 has not been shown. Depending upon its position, arm 17 applies either the output of delay line 77 and resistor 84 or the output from the sum of the delay lines 77 and 78 through coupling capacitor 85 to grid 86 of triode 87. Lead 89 joins the outputs from tubes 83 and 87 and the resulting pulsed pair signal is fed to modulator 24 (not shown) via capacitor 91. Tubes 83 and 87 have a common plate load resistor 92 and the grids of these tubes are connected to the B— supply, respectively, by resistors 93 and 94.

Figure 4:
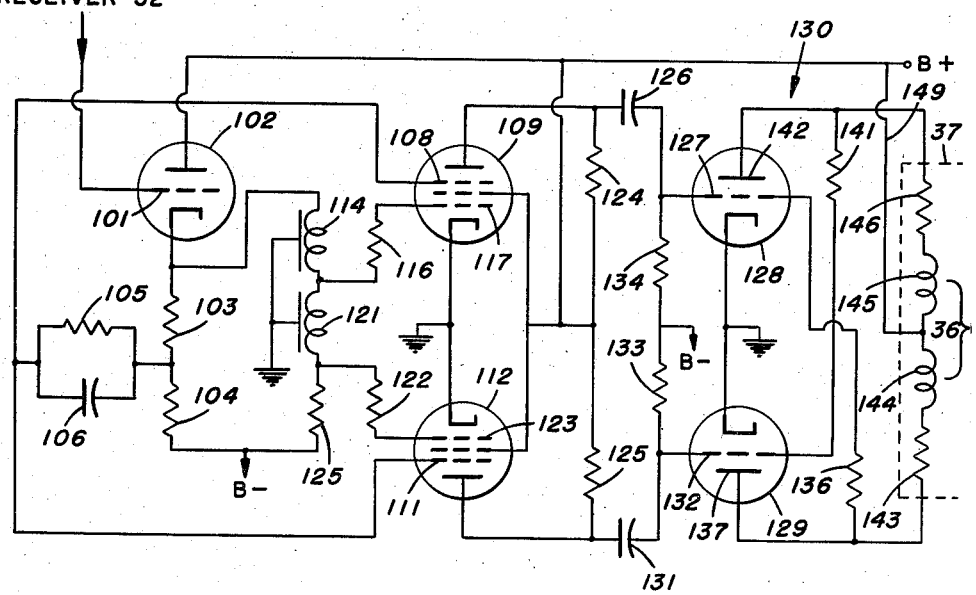
Fig. 4 shows a circuit diagram of components which can be employed in the receiving unit of Fig. 2.

In Fig. 4 there is shown a system which is capable of performing the functions of decoders 34 and 35 of the receiving unit of Fig. 2. After demodulation in receiver 32, the received signal is fed to grid 101 of cathode follower tube 102. Resistors 103 and 104 form the cathode load. Part of the cathode follower output is applied undelayed through the parallel combination of resistor 105 and capacitor 106 to the suppressor 108 of coincidence tube 109 and to suppressor 111 of coincidence tube 112. A portion of the output from the cathode follower tube 102 is delayed by delay line 114 and applied by limiting resistor 116 to the control grid 117 of tube 109. Another portion is applied through the series combination of delay line 114, delay line 121, and limiting resistor 122 to the control grid 123 of tube 112. Delay lines 114 and 121 of Fig. 4 and delay lines 77 and 78 of Fig. 3 have, respectively, equal delays. The series connected delay lines 114 and 121 are terminated in the surge impedance resistor 125 which is returned to a cut-off bias voltage B—. A ground potential is provided for the cathodes of coincidence tubes 109 and 112 and a B+ potential for the screen grids. The output of tube 109 is conducted through coupling capacitor 126 to grid 127 of tube 128 which along with tube 129 and associated components comprise a flip-flop circuit 130. Similarly, the output of tube 112 is fed via coupling capacitor 131 to the grid 132 of tube 129. Resistors 133 and 134 join grids 132 and 127 respectively, to a supply of negative voltage B—. Grid 127 is coupled through resistor 136 to the plate 137 of tube 129 and grid 132 is coupled through resistor 141 to the plate 142 of tube 128. A series combination of resistor 143, winding 144, winding 145 and resistor 146 joins plates 142 and 137. Windings 144 and 145 constitute coil 36 of switch 37, which is shown in Fig. 2. The point of connection of windings 144 and 145 is placed at a B+ potential by means of conducting lead 149.

In the transmitting unit of Fig. 1, which is located at the reference point, motor 10 moves antenna 11 back and forth over any chosen angle of coverage. When antenna 11 moves in one direction (e. g. to the right) coder 21 is connected by switch 16 to modulator 24 which modulates a carrier wave in transmitter 25 with one code. When the antenna moves in the other direction (left), coder 23 is employed in a similar manner. Thus, a narrow scanning beam 12 is produced which has a modulation of one code during a right movement and modulation of another code during a left movement.

The receiver of Fig. 2 is placed on the object whose angular position is being determined. An R. F. radio frequency voltage is generated in antenna 31 when scanning beam 12 sweeps past the receiving point. This voltage is amplified and demodulated in receiver 32 so that the resulting output signal is substantially identical to the coded signal produced by either coder 21 or 23 of the transmitter unit. Either decoder 34 or decoder 35 will be activated depending upon which code is contained in this output signal. If decoder 35 is activated, the current in coil 36 will be in a direction to urge switch arm 41 to contact terminal 43. Then, direct current flows from the positive terminal of source 45 through the upper part of potentiometer 46, D. C. meter 49, and resistors 48 and 47 to the negative terminal of source 45. Likewise, when the right decoder 34 energizes coil 36, arm 41 contacts terminal 42 and direct current flows from the positive terminal of source 45 to terminal 42 through resistors 47 and 48, meter 49 and the lower part of potentiometer 46 to the negative terminal of source 45. Thus, the direction of current flow through meter 49 is determined by the energization of coil 36 by the decoders. This current flow has a square wave shape similar to wave form 40 and the periods of the positive and negative half cycles are a function of the angular position and direction of the receiving point from the center line of scan. Direct current meter 49 produces an indication of the average value of waveform 40 which is also a function of the angular position and direction of the receiving point. Arm 51 of potentiometer 46 is adjustable for calibration purposes or for adapting the receiving unit for different applications. The value of resistor 47 can be changed to adjust the sensitivity and resistor 48 in cooperation with capacitor 52 can be varied to adjust the damping of the D. C. instrument.

In the coding and switch arrangement shown in Fig. 3, a single-swing free-running blocking oscillator 60 is employed to produce short pulses, e. g. 1 $\mu$sec. (microsecond) pulses at a rate of 1,000 per second. When the transmitter unit is energized by source B+, the sporadic disturbances on grid 67 are amplified by the circuit and fed back by transformer action from the plate winding 62 to secondary winding 65 to the grid. This build-up continues until grid current is drawn and capacitor 66 is charged thereby. The plate current of tube 61 completes a half cycle positive swing at the resonant frequency of the transformer circuit 60 and then swings negative. The negative plate current swing is transformer coupled to the grid circuit and with the aid of the charge on capacitor 66 forces grid 67 far below cut-off. Grid 67 is held below cut-off for a relatively long period (e. g. 1000 $\mu$sec.) which is determined by the discharge time of capacitor 66 through resistor 68, and after discharge the process is repeated. Winding 71 delivers the positive pulses to grid 72 of cathode follower 70, which is so biased that tube 73 conducts only during occurrence of positive pulses. Resistor 76 lowers the driving impedance of tube 73 to match that of delay lines 77 and 78. Undelayed positive pulses are applied via capacitor 81 to amplifier tube 82. When switch arm 17 contacts terminal 18, the output of tube 73 is delayed by delay line 77, e. g. 6 $\mu$sec., and fed through capacitor 85 to tube 87. The output of the system which is fed to modulator 24 consists of the sums of the outputs of tubes 83 and 87 or, in other words, consists of paired pulses which for this chosen delay are separated by 6 $\mu$sec. When switch arm 17 contacts terminal 19, the pulses are delayed by the sum of delay lines 77 and 78, e. g. 10 $\mu$sec. and the resulting output which is fed to modulator 24 comprises paired pulses separated by 10 $\mu$sec. A time period of approximately 1,000 $\mu$sec. separates the pairs.

In the receiver unit shown in Fig. 4, the pulsed coder signal from receiver 32 is applied to grid 101 of cathode follower tube 102. Part of the output from this tube is applied undelayed to the suppressor grids of coincidence tubes 109 and 112. Resistor 105 provides a D.-C. return for the suppressor grids to a cut-off bias B—. The output of the cathode follower is fed to delay line 114 which must have the same delay as delay line 77 of Fig. 3, which for this illustration is chosen at 6 $\mu$sec. and applied by limiting resistor 116 to the control grid 117 of coincidence tube 109. In similar manner, the output of tube 102 is delayed a total of 10 $\mu$sec. through the 6 $\mu$sec. delay line 114 and the 4 $\mu$sec. delay line 121 and is applied by resistor 122 to the control grid 123 of coincidence tube 112. Therefore, when a pair of 6 $\mu$sec. pulses are received, there will be coincidence in tube 109 between the second pulse of the pair which is applied without delay to the suppressor and the first pulse of the pair which has ben delayed 6 $\mu$sec. in delay line 114 before being fed to grid 117. Likewise, there will be coincidence in tube 112 when a pair of 10 μsec. pulses are received. The coincidence tubes are biased to conduct only when there is coincidence between pulses on the grids and suppressors. The flip-flop multivibrator 130 is used to actuate switch 37. When tube 128 conducts, its plate current through winding 145 causes switch arm 41 to go to and remain in one position in contact with terminal 42. At the same time, the voltage drop across resistor 146 maintains grid 132 of tube 129 below cut-off through the voltage divider action of resistors 141 and 133. When a negative pulse from the plate of coincidence tube 109 is conducted by capacitor 126 to grid 127 of tube 128, the voltage on plate 142 is raised which results in the raising of the grid voltage of tube 129, allowing this tube to conduct. The conduction current decreases the plate voltage of tube 129 and this decrease in voltage is coupled back to the negative going grid 127 of tube 128 which initiated the switching action. This positive feedback produces a complete and very rapid switching action to the other stable state of the flip-flop circuit with tube 129 in a conducting condition. Similarly, a negative pulse from the plate of tube 112 is coupled through capacitor 131 to the grid of tube 129 to cause the switching action to reverse. The overall action of this decoding system is, therefore, to cause switch arm 41 to go to (or remain in) one position when right code information is received and cause the switch to go to (or remain in) the other position when left code information is received.

A system has been disclosed comprising transmitting and receiving units for indicating the angular position of a receiving point with respect to a reference direction from a reference point. The transmitting unit, which is located at the reference point, produces a scanning beam having a different code for each direction of movement which is scanned about a reference direction. The receiver unit, which is situated at the receiving point, produces a timing operation each time the transmitted beam sweeps across the receiving point, which timing operation is different for each code. Specific coding and decoding units have been disclosed for producing the transmitted coded signals and for converting the received coded signals into timing operations. This system has the advantages of simplicity, low cost of construction and utility for functions other than angular position indicating.

Obviously many modifications and variations of the present invention are possible in the light of the above teachings. It is therefore to be understood that within the scope of the appended claims the invention may be practiced otherwise than as specifically described.

What is claimed is:

1. A transmitting unit comprising transmitter means for producing a carrier wave, antenna means coupled to said transmitter means for radiating a narrow scanning beam, means for moving said scanning beam back and forth through a selected scanning angle, and means for modulating the carrier wave with a signal comprising pulse pairs having one separation when the scanning beam is moving in one direction and another separation when the scanning beam is moving in the other direction.

2. A transmitting unit comprising transmitter means for producing a carrier wave; an antenna coupled to said transmitter means for radiating a narrow scanning beam, means for moving said scanning beam through a selected scanning angle alternately in reverse directions; modulating means coupled to said transmitter means; first coding means for producing a series of first pulse pairs, wherein the two pulses in each pair are spaced by a much smaller time period than that between successive pairs; second coding means for producing a series of second pulse pairs, wherein the two pulses in each pair are spaced by a time period which is different from the time period between the pulses of said first pulsed pair and which is much smaller than that between successive pairs; and means for alternately connecting said first and second coding means to the input of said modulating means in synchronism with the reversing of said scanning beam.

3. A receiving unit comprising means for receiving transmitted signals; means responsive to the reception of a first coded signal comprising paired pulses of one separation for producing an electrical output; and means responsive to the reception of a second coded signal comprising paired pulses of a different separation for producing another electrical current of another polarity.

4. The receiving unit of claim 3 to which indicator means are provided for producing an indication which is responsive to the average time integral of the electrical outputs.

5. A receiving unit comprising an antenna for producing an input voltage upon reception of a radiated signal, receiver means connected to said antenna for demodulating said input voltage, a first decoder connected to said receiver means and responsive to a demodulated signal of a first code comprising pairs of pulses having one separation for producing a positive direct current and a second decoder connected to said receiver means and responsive to a demodulated signal of a second code comprising pairs of pulses having another separation for producing a negative direct current.

6. The receiving unit of claim 5 to which indicator means are provided for producing an indication which is responsive to the average time integrated value of the direct currents.

7. A receiving unit comprising an antenna for producing an input voltage upon reception of a radiated signal; receiver means connected to said antenna for demodulating said input voltage; an averaging direct current meter having first and second terminals, a direct current voltage source having a positive terminal and a negative terminal; variable direct current potential means connected to the second terminal of said direct current meter therefor for providing a direct current potential; an electrically responsive switch for connecting the first terminal of said direct current meter to either the positive or negative terminal of said direct current source depending on the direction and energization of said switch; a first decoder connected to said receiver means and responsive to a demodulated signal of a first code for energizing said switch in a first direction, and a second decoder connected to said receiver means and responsive to a demodulated signal of a second code for energizing said switch in a second direction.

8. A receiving unit comprising an antenna for producing an input voltage upon reception of a radiated signal, receiver means connected to said antenna for demodulating said input voltage, an averaging direct current meter with first and second terminals, a direct current source having a positive terminal and a negative terminal, means connected to the second terminal of said direct current meter for producing a direct current voltage of adjustable magnitude and polarity, electrically responsive switch means for connecting the first terminal of said direct current meter to either the positive or negative terminal of said direct current source depending upon the direction of energization of said switch means, and decoding means responsive to paired pulses of one separation for energizing said switch in one direction and responsive to paired pulses of a different separation for energizing said switch in another direction.

9. A receiving unit comprising an antenna for producing an input voltage upon reception of a radiated signal, receiver means connected to said antenna for demodulating said input voltage, an averaging direct current meter wtih first and second terminals, a direct current source with a positive terminal and a negative terminal, means connected to the second terminal of said direct current meter for producing a direct current voltage of adjustable magnitude and polarity, electrically responsive switch means for connecting the first terminal of said direct current meter to either the positive or negative terminal of said direct current source depending upon the direction of energization of said switch means, a first delay circuit connected to produce a first delayed output from the output of said receiver means, a second delay circuit connected to produce a second delayed output from the output of said receiver means, a first coincidence circuit connected to produce an output when the output of said receiver means and the output of said first delay circuit occur simultaneously, a second coincidence circuit connected to produce an output when the output of said receiver means and the output of said second delay circuit occur simultaneously, a flip-flop circuit with two amplifying components and connected to energize the switch means in one direction when one amplifying component is conducting and in another direction when the other amplifying component is conducting, and conducting leads for connecting the output of said first coincidence circuit to one amplifying component and for connecting the output of said second coincidence circuit to the other amplifying component.

10. A combination comprising: a transmitting unit having means for producing a carrier wave, antenna means coupled to said carrier wave producing means for radiating a narrow scanning beam, means for moving said antenna means through a selected scanning angle alternately in reverse directions, and means for modulating the carrier wave with a signal comprising pulse pairs having one separation when said antenna is moving in one direction and pulse pairs of a different separation when said antenna is is moving in the other direction; and a receiving unit having means for receiving said scanning beam, means responsive to the reception of pulse pairs of said one separation to produce an electrical output, and means responsive to the reception of pulse pairs of said different separation to produce another electrical output.

11. The system of claim 10 to which an indicator is provided for giving an indication of the average value of the electrical outputs.

12. A combination comprising: a transmitting unit having means for producing a carrier wave, antenna means coupled to said carrier producing means for radiating a narrow scanning beam, means for causing said beam to scan through a selected scanning angle alternately in reverse directions, first coding means for producing a first code comprising pulse pairs of one separation, second coding means for producing a second code comprising pulse pairs of another separation, modulating means for modulating said carrier wave, and means for alternately connecting said first and second coding means to the input of said modulating means in correlation with the alternate reversing of said scanning beam; and a receiving unit comprising an antenna for producing an input voltage when energized by said scanning beam, receiver means connected to said antenna for demodulating said input voltage, first decoder means connected to said receiver means and responsive to said first code for producing an electrical signal of one characteristic, and second decoder means connected to said receiver means and responsive to said second code for producing an electrical signal of another characteristic.

13. The combination of claim 12 to which indicating means is provided for producing an indication of the average value of the characteristics.

14. A combination comprising: transmitter means for producing a carrier wave, an antenna coupled to said transmitter means for radiating a narrow scanning beam, means for causing said beam to scan through a selected scanning angle alternately in reverse directions, first coding means for producing a series of first pulse pairs wherein the pulses in each pair are spaced by a first time period which is much smaller than that existing between successive pairs, second coding means for producing a series of second pulse pairs wherein the pulses in each pair are spaced by a second time period which is different from said first time period and which is much smaller than that between successive pairs, modulating means for modulating said carrier wave, and means for alternately connecting said first and second coding means to the input of said modulating means in synchronism with the alternate reversing of said scanning beam; and a receiving unit comprising an antenna for producing an input voltage upon reception of a radiated signal, receiver means connected to said antenna for demodulating said input voltage, an averaging direct current meter with first and second terminals, a direct current source having a positive terminal and a negative terminal, means connected to the second terminal of said direct current meter for producing a direct current voltage of adjustable magnitude and polarity, electrically responsive switch means for connecting the first terminal of said direct current meter to either the positive or negative terminal of said direct current source depending upon the direction of energization of said switch means, first decoding means responsive to said first pulse pairs only for energizing said switch in one direction, and second decoding means responsive to said second pulse pairs only for energizing said switch in another direction.

15. A transmitting unit comprising: means to generate a carrier wave, antenna means coupled to said carrier wave generating means for radiating a narrow scanning beam, means for alternately moving said scanning beam in different directions through a selected scanning angle, means to modulate said carrier wave generating means, pulse generating means, first and second delay circuits coupled to said pulse generating means for producing a first and second delayed output therefrom, switching means to selectively couple the output from said first or second delay circuits to said modulating means, means to couple the undelayed output from said pulse generating means to said modulating means, and means coupled to said scanning beam moving means to actuate said switching means, whereby pulse pairs having one separation are coupled to said modulating means when said scanning beam is moving in one direction and pulse pairs having a different separation are coupled to said modulating means when said scanning beam is moving in the other direction.

16. A combination comprising: the transmitting unit of claim 15 and a receiving unit comprising an antenna for producing an input voltage upon reception of said scanning beam, receiver means connected to said antenna for demodulating said input voltage, an averaging direct current meter with first and second terminals, a direct current source having a positive terminal and a negative terminal, means connected to the second terminal of said direct current meter for producing a direct voltage of adjustable magnitude and polarity, electrically responsive switch means for connecting the first terminal of said direct current meter to either the positive or negative terminal of said direct current source depending upon the direction of energization of said switch means, first decoding means connected to said receiver means responsive to pulse pairs having said one separation for energizing said switch in one direction, and second decoding means connected to said receiver means responsive to pulse pairs having said different separation for energizing said switch in another direction.

17. A combination comprising: the transmitting unit of claim 15 and a receiving unit which comprises an antenna for producing an input voltage upon reception of said scanning beam, receiver means connected to said antenna for demodulating said input voltage, an averaging direct current meter with first and second terminals, a direct current source with a positive terminal and a negative terminal, means connected to the second terminal of said direct current meter for producing a direct voltage of adjustable magnitude and polarity, electrically responsive switch means for connecting the first terminal of said direct current meter to either the positive or negative terminal of said direct current source depending upon the direction of energization of said switch means, a third delay circuit connected to produce a delayed output from the output of said receiver means equal to that produced by said first delay circuit, a fourth delay circuit connected to produce a delayed output from the output of said receiver means equal to that produced by said second delay circuit, a first coincidence circuit connected to produce an output when the output of said receiver means and the output of said third delay circuit occur simultaneously, a second coincidence circuit connected to produce an output when the output of said receiver means and the output of said fourth delay circuit occur simultaneously, a flip-flop circuit with two amplifying components connected to energize the switch means in one direction when one amplifying component is conducting and in another direction when the other amplifying component is conducting, means connecting the output of said first coincidence circuit to one amplifying component and means connecting the output of said second coincidence circuit to the other amplifying component.

18. A combination comprising: transmitter means for producing a carrier wave, an antenna coupled to said transmitter means for radiating a narrow scanning beam, means for moving said scanning beam through a selected scanning angle alternately in reverse directions, modulating means coupled to said transmitter means, first coding means for producing a series of pulse pairs having a first separation, second coding means for producing a series of pulse pairs having a second separation, and means for alternately connecting said first and second coding means to the input of said modulating means in synchronism with the reversing of said scanning beam; and a receiver unit comprising an antenna for producing an input voltage upon reception of said scanning beam, receiver means connected to said antenna for demodulating said input voltage, an averaging direct current meter with first and second terminals, a direct current source with a positive terminal and a negative terminal, means connected to the second terminal of said direct current meter for producing a direct voltage of adjustable magnitude and polarity, electrically responsive switch means for connecting the first terminal of said direct current meter to either the positive or negative terminal of said direct current source depending upon the direction of energization of said switch means, a first delay circuit connected to said receiver means to produce therefrom a first delayed output equal to said first separation, a second delay circuit connected to said receiver means to produce therefrom a second delayed output equal to said second separation, a first coincidence circuit connected to produce an output when the undelayed output of said receiver means and the output of said first delay circuit occur simultaneously, a second coincidence circuit connected to produce an output when the undelayed output of said receiver means and the output of said second delay circuit occur simultaneously, a flip-flop circuit with two amplifying components connected to energize the switch means in one direction when one amplifying component is conducting and in another direction when the other amplifying component is conducting, means connecting the output of said first coincidence circuit to one amplifying component and means connecting the output of said second coincidence circuit to the other amplifying component.

References Cited in the file of this patent

UNITED STATES PATENTS

| | | |
|---|---|---|
| 1,437,400 | Connors | Dec. 5, 1922 |
| 2,112,283 | Fritz | Mar. 29, 1938 |
| 2,485,365 | Fremery | Oct. 18, 1949 |